Nov. 7, 1939.　　　　G. H. HUFFERD　　　　2,178,858
LINK BODY AND METHOD OF MAKING SAME
Filed Sept. 27, 1937
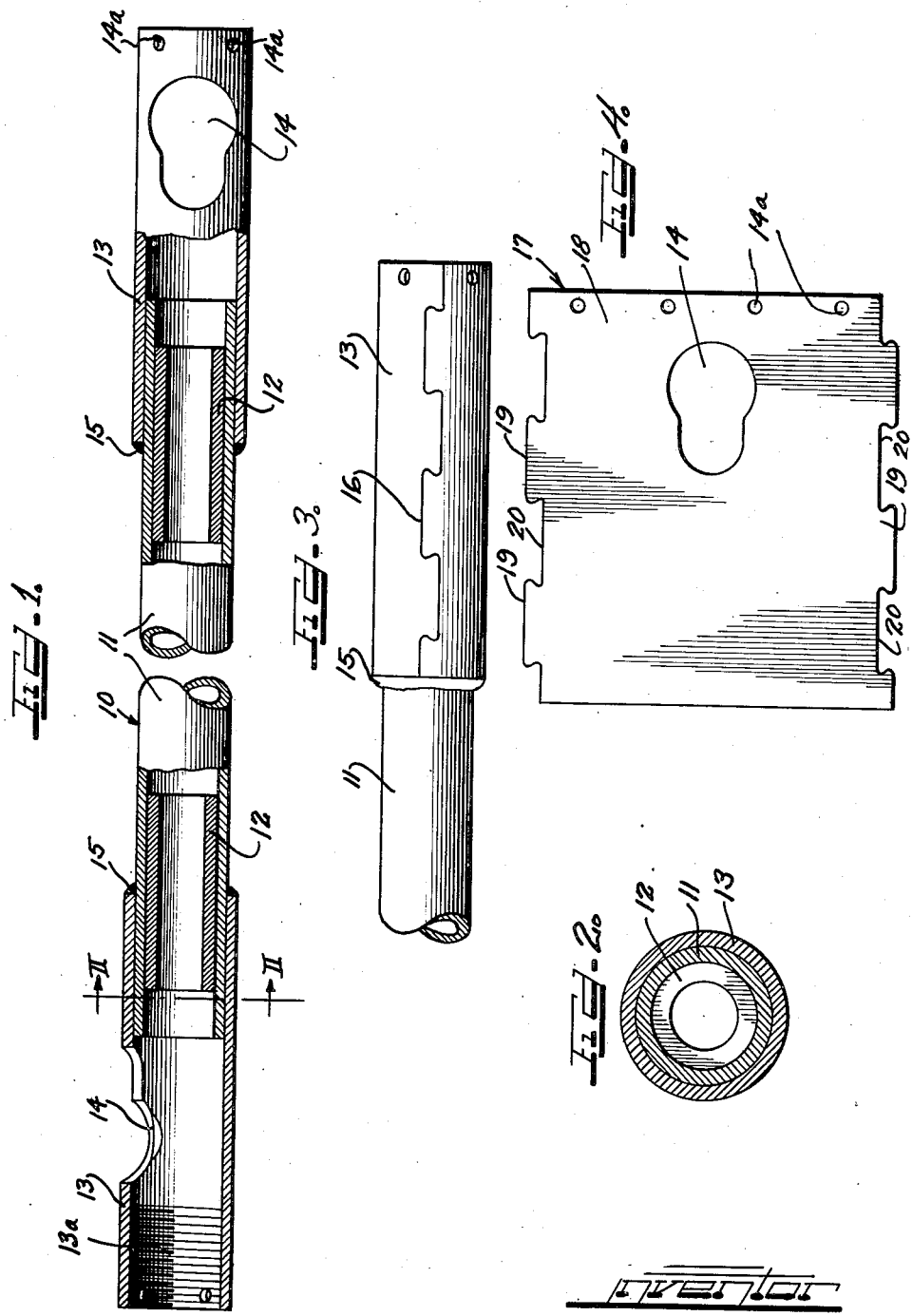
Inventor
GEORGE H. HUFFERD.
by Charles... Atty.

Patented Nov. 7, 1939

2,178,858

UNITED STATES PATENT OFFICE 2,178,858

LINK BODY AND METHOD OF MAKING SAME

George H. Hufferd, Detroit, Mich., assignor to Thompson Products, Incorporated, Cleveland, Ohio, a corporation of Ohio Application September 27, 1937, Serial No. 165,838

10 Claims. (Cl. 29—152)

This invention relates to drag links, reach rods, tie rods or the like link body members. More specifically, this invention relates to a drag link body built up from tubes and/or sheets of metal and includes a method of making drag link bodies.

It has heretofore been proposed to make drag links from a section of metal tubing and tubular end socket members of larger diameter than the tubing. The socket members have been fitted over the ends of the metal tubing and the overlapping portions of the socket member and tubing have been upset to clamp the sockets on the tubing and to enlarge the diameter of the end of the tubing disposed in the sockets for locking the sockets on the tubing. However, this type of drag link assembly has required the use of special upsetting dies and involves an undesirable working or pressing of the metal parts forming the assembly.

It is highly desirable to prepare link bodies such as drag links or tie rods from metal tubing and/or sheet metal without bending or otherwise pressing the constituent metal parts after assembly.

According to this invention, a metal tube or pipe of either the seamless or butt welded type is used for the intermediate section of the link body. End sections are press fitted over the ends of the metal tubes to form the link sockets. These end sections can be formed from sheet metal and provided with an interlocking seam or can be butt welded or seamless tubing. The end sections are then welded onto the metal tubing.

It has been found that the weld draws the hardness of the metal throughout an area surrounding the welded seam. Therefore according to this invention metal sleeves are press fitted into the ends of the metal tube so that intermediate portions of the sleeves are adjacent the weakened area created by the weld. The sleeve inserts not only serve to reinforce the link assembly adjacent the weld thereof but also distribute stresses encountered during use of the link body along an area of the tubing. Each sleeve thus performs an important function in the links of this assembly.

It is then an object of this invention to construct link bodies from nested tubular elements and to reinforce the assembly with metal sleeves.

A further object of this invention is to provide link assemblies having a tubular intermediate section and end socket members press fitted on the ends of the intermediate section with reinforcing sleeves disposed in the intermediate section having their intermediate portions adjacent the ends of the socket members.

Another object of this invention is to provide link bodies having end socket members welded on metal tubes and to relieve welding strains with reinforcing sleeve members press fitted into the tubes.

A further object of this invention is to provide a method of making a drag link body from tubular members involving only press fitting and welding operations.

Other and further objects of the invention will become apparent from the following detailed description of the annexed sheet of drawings which discloses a preferred embodiment of the invention.

The invention will be hereinafter described specifically as being embodied in a drag link body, but it should be understood that the principles of this invention apply to link bodies in general, such as tie rods and the like.

On the drawing:

Figure 1 is a broken side elevational view of a drag link according to this invention, with parts shown in vertical cross section.

Figure 2 is a vertical cross sectional view taken along the line II—II of Fig. 1.

Figure 3 is a fragmentary view of one end of a drag link body according to a preferred embodiment of the invention.

Figure 4 is a plan view of a flat metal blank used for forming the socket on the end of the drag link body as shown in Fig. 3.

As shown on the drawing:

In Fig. 1 the reference numeral 10 designates generally a drag link body composed of an intermediate metal tube 11, reinforcing sleeves 12 press fitted into the ends of the tube 11 and tubular end sockets 13 press fitted onto the ends of the tube 11. The end sockets 13 are provided with key hole openings 14 through a side wall thereof. The inner ends of the socket members 13 are welded to the tubes 11 by welds 15.

The outer ends of the socket members 13 are interiorly threaded as at 13a and have two pairs of diametrically opposite holes 14a therein for receiving cotter pins therethrough to lock plugs threaded on the threads 13a.

The tube 11 may be either a seamless metal tube or a butt welded tube or pipe.

The sleeves 12 are either short seamless metal tubes or butt welded tubes or pipes and are force fitted or press fitted into the ends of the tube 11 to extend along an area on each side of the welds 15.

The end sockets 13 may be composed of seamless metal tubes, butt welded tubes or, as shown in Figs. 3 and 4, can be formed from sheet metal with an interlocking seam joining the edges of the sheets as will be hereinafter more fully described.

As shown in Fig. 1, the tubular sockets 13 are of larger diameter than the intermediate tube 11 but preferably have their interior diameters slightly less than the exterior diameter of the tube 11, so that a tight force fit or press fit can be obtained between the portion of the socket disposed around the ends of the tube 11 and the tube.

The key hole openings 14 as shown in Fig. 1 are disposed at right angles to each other, but it should be understood that these openings may be on the same side of the assembly as when making tie rods by merely correctly positioning the socket when it is press fitted onto the tube.

The welds 15 extend around the whole diameter of the tube 11 at the inner ends of the sockets 13. It is known that a weld tends to draw out the hardness of the metal being welded and according to this invention the reinforcing sleeves 12 prevent bending or failure of the link body along an area surrounding the welds 15 by distributing stresses adjacent the weld area over a larger area. Furthermore, there is an abrupt step down between the ends of the sockets 13 and the tube 11 that might cause failure of the assembly during extreme working conditions. The sleeves 12, by extending from both sides of this abrupt step down, distribute the stresses and strains throughout a greater area thereby preventing failure.

As shown in Fig. 3, the end socket member 13 has the longitudinal edges thereof secured together by an interlocking seam 16. The socket 13 may be formed from the metal blank 17 shown in Fig. 4. The blank 17 comprises a rectangular flat sheet of metal 18 having a key hole slot 14 punched therethrough intermediate the ends thereof and holes 14a punched along an end edge thereof. Alternating dove-tailed tabs 19 and grooves 20 are formed along the side edges thereof. The tabs 19 and grooves 20 are arranged in complementary relation on the opposite sides of the blank 18.

The blank 18 is then merely rolled or bent around a mandrel (not shown) into a tubular shape to bring the side walls of the blank into contiguous relation. The tabs 19 are then seated into their complementary grooves 20 to form the interlocking seam 16 of the socket member 13.

From the above description it should be understood that this invention provides a simple link body construction composed of tubular parts including reinforcing sleeves for distribution of stresses.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A link body comprising a metal tube, tubular end socket members fitted over and surrounding the end portions of the tube, said socket members extending beyond the tube, and metal sleeves in the tube in engagement therewith having intermediate portions thereof in alignment with the inner ends of the socket members.

2. A link body comprising a metal tube, tubular end socket members telescoped over the ends of the tube and extending longitudinally therefrom, annular welds around the tube joining the ends of the socket with the tube and short metal sleeves in the tube in frictional engagement therewith and extending from the annular welds into spaced relation from the weld area to reinforce the assembly.

3. A link body member comprising an intermediate pipe, tubular socket members having their inner ends thereof surrounding the end portions of the pipe along an area of the side wall thereof, said sockets having key hole openings therein in spaced relation from the ends of the pipe and short tubular sleeves in the pipe in tight engagement with the ends thereof, said sleeves extending from an area of the pipe surrounded by the socket members into spaced relation from said area for distributing stresses at the inner ends of the sockets along a portion of the length of the pipe.

4. A link body member comprising an intermediate tube, sleeves pressed into the ends of the tube in tight engagement therewith and extending along a portion of the length of the tube, tubular socket members in tight frictional engagement around the ends of the tube and extending inwardly from said ends, the inner ends of the socket members being in alignment with an intermediate portion of the sleeves in the tube and annular welds disposed around the tube securing the sockets to the tube.

5. A link body member comprising a section of metal tubing, short sleeve members in the ends of the metal tubing in tight frictional engagement therewith, tubular socket members formed from sheet metal and having the contiguous edges thereof joined by an interlocking seam, said sockets having their inner end portions telescoped over the end portions of the tubing, the ends of said socket members being in alignment with an intermediate portion of the sleeves in the tube and annular welds around the tube joining the ends of the socket members with the tube whereby said sleeves in the tube reinforce the welded area and distribute stresses from said area along the tube.

6. The method of making link bodies which comprises force fitting a cylindrical reinforcing member in an end of a metal tube, force fitting a tubular socket member over the same end of said tube, and welding the socket member to the tube.

7. The method of making a link body which comprises pressing short sleeves into the ends of a metal tube, telescoping the inner end portions of tubular socket members over the end portions of said tube with the inner ends of the socket members in alignment with intermediate portions of the sleeves in the tube and welding the inner ends of the sockets to the tube.

8. The method of making a link body which comprises forming a flat sheet metal blank with a key hole opening therethrough and alternating dove-tailed tabs and grooves along the sides thereof with the tabs and grooves on opposite sides of the blank being in complementary relation, rolling the blank into tubular form with the dove-tailed tabs seated in the complementary grooves to form an interlocking seam, pressing an end of the thus formed tube around the end of a metal pipe, force fitting a short sleeve into the pipe to position an intermediate portion of the sleeve in alignment with the end of the socket on the pipe and welding said end of the socket to the pipe.

9. A link body member comprising a rod having a hollow end portion, a tubular end socket member telescoped over said hollow end of the rod for a distance along said end, said socket member extending beyond the rod, and a metal sleeve in said hollow end of the rod in tight frictional engagement therewith, said sleeve having an intermediate portion thereof in alignment with the inner end of the socket member whereby the sleeve will distribute stresses at the inner end of the socket along a portion of the length of the rod.

10. The method of making drag links and the like which comprises inserting a metal sleeve into the hollow end of a metal rod, and telescoping an end of a socket member over the same end of said rod to place the inner end portion of said socket member in alignment with an intermediate portion of the sleeve in the rod.

GEORGE H. HUFFERD.